US011366519B2

(12) United States Patent
Eash et al.

(10) Patent No.: US 11,366,519 B2
(45) Date of Patent: *Jun. 21, 2022

(54) RELATIVE POSITION BASED EYE-TRACKING SYSTEM

(71) Applicant: Avegant Corp., San Mateo, CA (US)

(72) Inventors: Aaron Matthew Eash, San Francisco, CA (US); Baker Ngan, San Francisco, CA (US); D. Scott Dewald, Dallas, TX (US); Andrew John Gross, Redwood City, CA (US); Edward Chia Ning Tang, Menlo Park, CA (US); Jindrich Semenec, Fremont, CA (US); Warren Cornelius Welch, III, Foster City, CA (US); William Tze-Tse Chien, Sunnyvale, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,000

(22) Filed: Jan. 4, 2021

(65) Prior Publication Data
US 2021/0200310 A1    Jul. 1, 2021

Related U.S. Application Data

(63) Continuation of application No. 16/517,443, filed on Jul. 19, 2019, now Pat. No. 10,884,492.
(Continued)

(51) Int. Cl.
*G06F 3/01* (2006.01)
*H04N 7/18* (2006.01)
*G06F 3/0484* (2022.01)

(52) U.S. Cl.
CPC .............. *G06F 3/013* (2013.01); *H04N 7/183* (2013.01); *G06F 3/0484* (2013.01)

(58) Field of Classification Search
CPC .......... G06F 3/011; G06F 3/012; G06F 3/013; G06F 3/0484; H04N 7/183
See application file for complete search history.

(56) References Cited

U.S. PATENT DOCUMENTS 3,806,725 A    4/1974   Leitz
5,982,555 A    11/1999  Melville et al.
(Continued)

FOREIGN PATENT DOCUMENTS

EP    0596868 A2      5/1994
WO   2016/018487 A2   2/2016
WO   2016/151581 A1   9/2016

OTHER PUBLICATIONS

Non Final Office Action, U.S. Appl. No. 16/517,443, dated Apr. 21, 2020, 22 pages.
(Continued)

*Primary Examiner* — Ryan A Lubitz
(74) *Attorney, Agent, or Firm* — Nicholson De Vos Webster & Elliott LLP; Judith Szepesi

(57) ABSTRACT

A relative position based eye tracking system includes a light source to illuminate a portion of the eye and an optical sensor to capture a sequence of samples of the portion of the eye. The system further includes a sample comparator to compare two samples and a relative position calculator to calculate a change in the position of the eye based on data from the sample comparator.

20 Claims, 10 Drawing Sheets

Related U.S. Application Data

(60) Provisional application No. 62/701,456, filed on Jul. 20, 2018.

(56) References Cited

U.S. PATENT DOCUMENTS

| | | |
|---|---|---|
| 6,299,307 B1 | 10/2001 | Oltean et al. |
| 7,736,000 B2 | 6/2010 | Enriquez et al. |
| 10,013,055 B2 | 7/2018 | Perek et al. |
| 2003/0146901 A1 | 8/2003 | Ryan |
| 2015/0331485 A1 | 11/2015 | Thukral et al. |
| 2016/0342205 A1* | 11/2016 | Shigeta ............... A61B 3/0041 |
| 2016/0364881 A1 | 12/2016 | Mallinson et al. |
| 2017/0122725 A1* | 5/2017 | Yeoh ................... G02B 27/017 |
| 2017/0123492 A1 | 5/2017 | Marggraff et al. |
| 2017/0131765 A1* | 5/2017 | Perek .................. G02B 5/3083 |
| 2017/0261610 A1* | 9/2017 | Scally .................... G01S 13/42 |
| 2018/0129282 A1* | 5/2018 | Sinay ....................... G06T 7/20 |
| 2019/0333480 A1* | 10/2019 | Lang ................... G02B 27/017 |
| 2019/0349576 A1* | 11/2019 | Yildiz ................ G02B 27/0149 |
| 2019/0354174 A1* | 11/2019 | Young ................... G06N 5/046 |

OTHER PUBLICATIONS

Notice of Allowability, U.S. Appl. No. 16/517,443, dated Sep. 8, 2020, 11 pages.

PCT Search Report, for PCT/US2019/042722, dated Oct. 18, 2019 (3 pages).

\* cited by examiner

RELATIVE POSITION BASED EYE-TRACKING SYSTEM

RELATED APPLICATION

The present application is a continuation of U.S. application Ser. No. 16/517,443 filed on Jul. 21, 2019, issued as U.S. Pat. No. 10,884,492 on Jan. 5, 2021, which application claims priority to U.S. Provisional Patent Application Ser. No. 62/701,456, filed on Jul. 20, 2018, both of which applications are incorporated herein by reference.

BACKGROUND

Eye-tracking technology is important in a variety of applications and systems, including, but not limited to, head-mounted display systems. Eye-tracking systems generally detect the orientation of the eye and output an estimate of the direction of the gaze of the eye. This gaze direction or gaze angle can be projected to determine a gaze point or point of interest that the user is focusing on. The applications for eye-tracking include ensuring that images displayed are displayed appropriately for the user's gaze, determining the location of an object in the real-world or virtual world, positioning the location of an object in a virtual/augmented display, identifying an area of interest on a screen, a document, or picture, or other uses.

Many systems use camera based technologies to track eye position. These systems track the center of the pupil or the position of reflections off the eye. Illumination is usually required to illuminate the pupil or generate reflections off of the eye.

This approach suffers from several shortcomings.

First, camera based solutions require a continuous video feed of the eye at relatively high resolution. This results in relatively large amounts of data being generated and sent, and the associated computing power required to analyze the data. Thus, it requires significant bandwidth, storage, and processing power.

Second, the optics of a camera place significant limitations on where the eye can be positioned. Due to the field-of-view and depth-of-focus of an eye-tracking camera, the region where the eye must be positioned for good tracking performance is generally quite small. When considering the large range of anthropomorphic differences in head, nose, marginal reflex distance, and eye position among the human population, creating robust camera-based eye-tracking solutions is challenging. Because this solution requires the camera to capture a view of the center of the eye, it limits the positions of the camera.

Third, latency and speed of eye-tracking data can be an important factor in many applications. Camera-based eye-tracking systems often have a latency of 10-30 ms, or more. The ability to quickly measure and possibly predict different types of eye-movements is related to latency and speed. For example, during a saccadic eye movement, the eye's movement can be up to about 900°/sec over durations as short as a few milliseconds. Camera based solutions for head mounted displays are generally limited to 60-120 Hz, which makes it difficult to track these types of fast movements. Additionally, increasing a camera's speed generally increases its bandwidth and power consumption.

Fourth, many camera based solutions require multiple illumination sources. A typical camera based solution will use a ring of infrared LEDs around the eye, often up to 10 LEDs per eye. Integrating LEDs in multiple locations around the eye can be a challenge for product design, power consumption, cost, and controls.

Fifth, the cost of adding high resolution cameras, multiple LED illumination sources, and visual image processing capabilities can be undesirable.

Therefore, the current camera based solutions are suboptimal.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
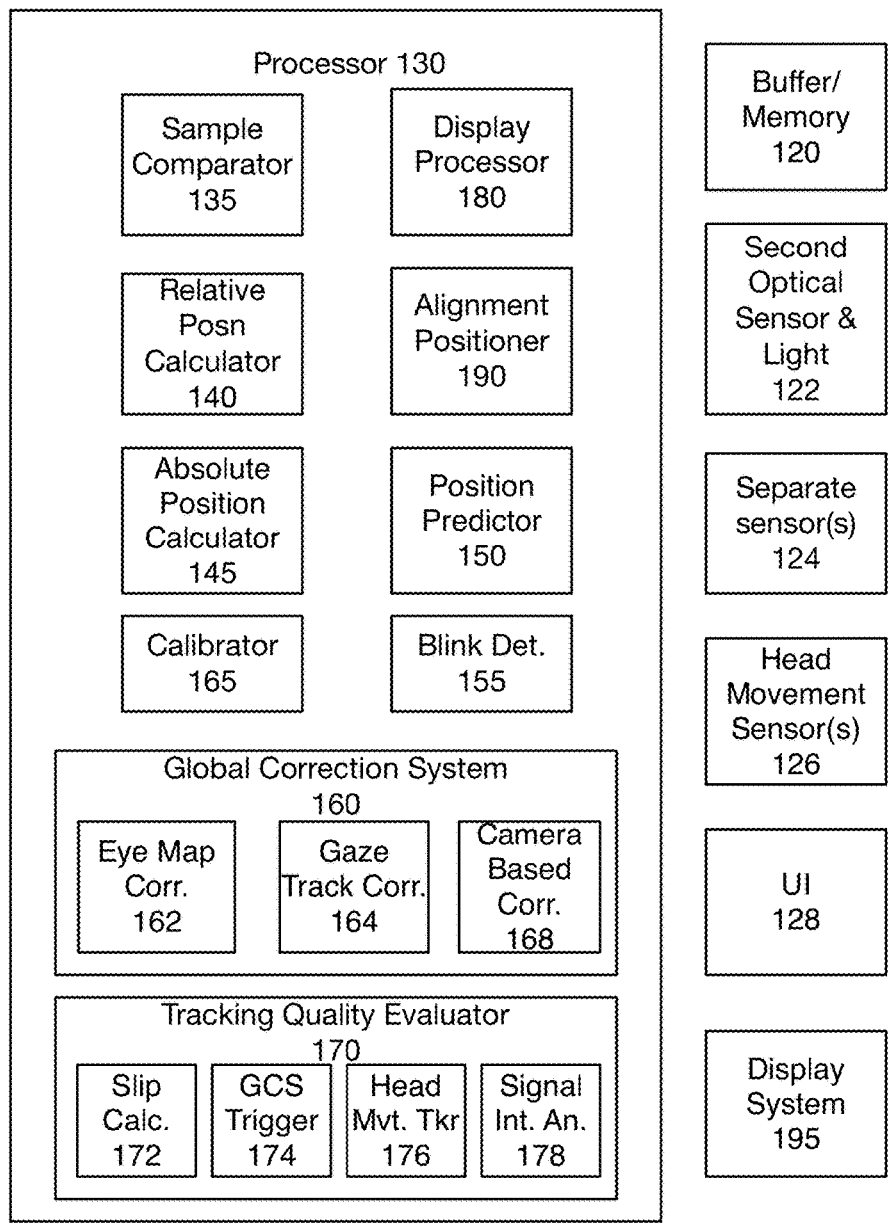
FIG. 1 is a block diagram of one embodiment of the relative position based eye-tracking system.

As noted above, there are numerous challenges to using camera-based eye tracking systems. These challenges can be overcome with an improved method, using relative eye-tracking. Instead of continuously imaging the eye with a camera to determine the absolute position of the pupil of the eye, or positions of infrared light spot reflections off of the eye, the relative eye tracking system can track features of the eye, surface variations of the eye, particles on the eye, motion of the eye, and/or signature patterns of laser speckle off of the eye to determine the relative position of the eye and the gaze vector. This relative position data can be used to calculate the absolute position, without the disadvantages discussed above for using the camera-based absolute eye tracking method.

The relative eye tracking system uses a high sample rate, low-power sensing technology, instead of cameras, which means it does not require high bandwidth and computing power. The relative eye tracking system, in one embodiment, images a non-centric portion of the eye, providing more flexibility in sensor and light placement, and more adaptability to a large range of anthropomorphic differences. The relative eye tracking system uses sensors that sample at a high sampling rate, in one embodiment 1000 Hz or higher. This provides low latency and improves prediction capabilities. In one embodiment, the relative eye tracking system uses a single illumination source, providing positioning flexibility. Thus, the relative eye tracking system uses lower cost sensors, reduce processing power, and reduced power consumption, providing an overall improved system compared to camera based eye tracking systems.

These eye tracking systems may be used in virtual reality systems, in augmented reality systems, in other eye tracking situations for example for advertising or research.

The relative position based eye tracking system user's data from a portion of the eye, not necessarily the center, and calculates relative motion based on data from that small area. Utilizing such relative motion tracking in a small field of view, non-centric to the eye provides a more flexible system, which has lower power consumption and can provide accurate data at a reduced cost.

The eye is covered with many visible small features, that are mostly in the iris and sclera, such as anterior ciliary arteries distributed in the sclera. Inside the iris there are many small structural folds that are visible as well. There is a high contrast edge where the iris meets the pupil, also referred to as the pupillary zone. The high contrast outside edge where the iris meets the sclera is the corneal limbus. The relative eye tracking system may utilize any of these portions of the eye for tracking relative movement. In one embodiment, the tracker can have a large working distance range, for example greater than 5 mm and less than 40 mm. This provides a large range of potential locations where the system may be placed.

By using relative motion tracking in a small field of view, the system can use a high frequency sensor, without consuming excess power.

In one embodiment, because the high frequency sensor obtains image data at 1000 Hz, or faster, the eye's ending location during a saccadic movement can be predicted by measuring the direction and peak velocity of the eye's motion. The system can also differentiate between a saccadic eye movement compared to a smooth pursuit or vestibular ocular reflex movement. These types of detections and predictions require that the eye-tracking data be measured and analyzed very rapidly. Using the relative motion tracking system describes enables fast enough tracking to differentiate between different types of eye movements, to predict the ending location for a saccadic eye movement and provide other data.

FIG. 1 is a block diagram of one embodiment of the system. The system includes a right eye light source 104, pointing at a portion of the right eye 102. The right eye light source 104 in one embodiment is an LED (light emitting diode). In another embodiment, the eye light source 104 uses laser scatter. In another embodiment, the light source 104 is a Doppler laser. In one embodiment, darkfield, brightfield or other mechanism may be used to illuminate the portion of the eye 102. The system includes a right eye light sensor 106. In one embodiment the light sensor 106 points at the same portion of the eye 102 as the eye light source 104. In one embodiment the light sensor 106 has a narrow field of view. The field of view of the sensor 106 is generally less than the whole eye, preferably less than 10 mm. The small light sensor 106 may be a photo diode array, charge coupled device (CCD), CMOS imaging array, a laser Doppler sensor, or another type of image sensor. In one embodiment, the light sensor 106 captures image data at a high frequency, in one embodiment the samples are captured at 1 KHz (e.g. 1000 samples per second). A parallel light source 114 and light sensor 116 are used to capture samples of the left eye 110.

In one embodiment, the illumination source and/or sensor used in the relative position sensor system can be positioned using a steering element. An example of a steering element is a one-or-more axis actuated mirror, or a one-or-more axis actuated lens. In one embodiment, the actuation is galvanometer, piezoelectric, capacitive, or thermally driven. This enables the illumination source and/or sensor to be correctly positioned for the users' eyes.

In one embodiment, the steerable illumination source and/or sensor can be swept across the eye to get a global absolute position of the eye based on the position data of the illumination source and the captured samples. In one embodiment, this may be used to provide calibration or correction data to the relative positioning system.

In one embodiment, the illumination source is a fiber optic coupled laser, where the laser is located away from the eye. The illumination is brought from the laser to the eye through an optical fiber.

In one embodiment, the optical sensor can track the eye features through optical flow. Optical flow is the pattern of motion of image elements between two consecutive samples caused by the relative motion of the object (the eye) and the detector. In one embodiment, the optical sensor is a small CMOS (complementary metal oxide semiconductor) (or CCD (charge coupled device) imaging array or photodiode array, used to capture a small area of the eye, which includes some of the visible features. The system then compares the samples and uses optical flow to calculate the relative motion of the eye. An example of a small imaging array could be a CMOS sensor with 18×18 pixels. The small area of the eye being tracked could be illuminated by a laser diode or an LED. These sensors provide high accuracy (over 5,000 counts per inch and rising), low latency (sample rates over 1 kHz) with low power consumption (<10 mW) in a small package size (less than 5 mm×5 mm×2 mm), making them attractive choices for this application.

In another embodiment, the changes indicating eye movement are tracked through alterations of a speckle pattern. A laser diode is directed toward the surface of the eye and its reflection results in a speckle pattern. This speckle pattern changes with motion, due to changes in the illuminated surface. The resulting dynamic speckle pattern can be tracked through optical flow with a small imaging array. This pattern does not rely on monitoring visible features of the eye, such as the ciliary arteries or iris.

In another embodiment, darkfield illumination is used to track textures or particles on the surface of the eye. Darkfield illumination is a technique that uses oblique light to illuminate, allowing only angled rays of light toward the sensor. In one embodiment, one or more LEDs or lasers illuminate the eye's surface at an oblique angle. Any textures or particles will scatter the light at the correct angles for sensing. Other light will pass through or reflect off resulting in a dark background.

In another embodiment, laser Doppler interferometry is used to track the eye position. A laser reflects off of the surface of the eye and interferes with a reference laser beam. The photo detector reads the interference pattern. The periodic variation of the feedback in the interference is used to measure the Doppler frequency and calculate the eye's velocity and relative position.

In one embodiment, one or more illumination sources are used, and one or more sensing arrays are used. In one embodiment, multiple sensors and/or illumination sources are included in the system, to have better performance under different lighting conditions, indoor vs outdoor, or to track the eye across more gaze angles. In one embodiment, multiple sensors may be used to reduce noise in the system. In one embodiment, the system may include multiple light sources and/or sensors, and select which sensor(s)/light source(s) to use based on various factors, such as signal quality, power level, anthropomorphic configuration of the user such as eye position, eye-lid position, etc. This ensures that the system has wide applicability.

A buffer or other memory 120 stores the data captured by the eye light sensors 106, 116. The captured data is referred to as a sample. For simplicity the below process addresses the processing of data from one light sensor 106, 116. One of skill in the art would understand that each eye has an associated light sensor 116 that captures data, and similar calculations are made for each eye, in one embodiment. Additionally, in some embodiments, there may be multiple light sensors 106, 116 associated with each eye.

Figure 9:
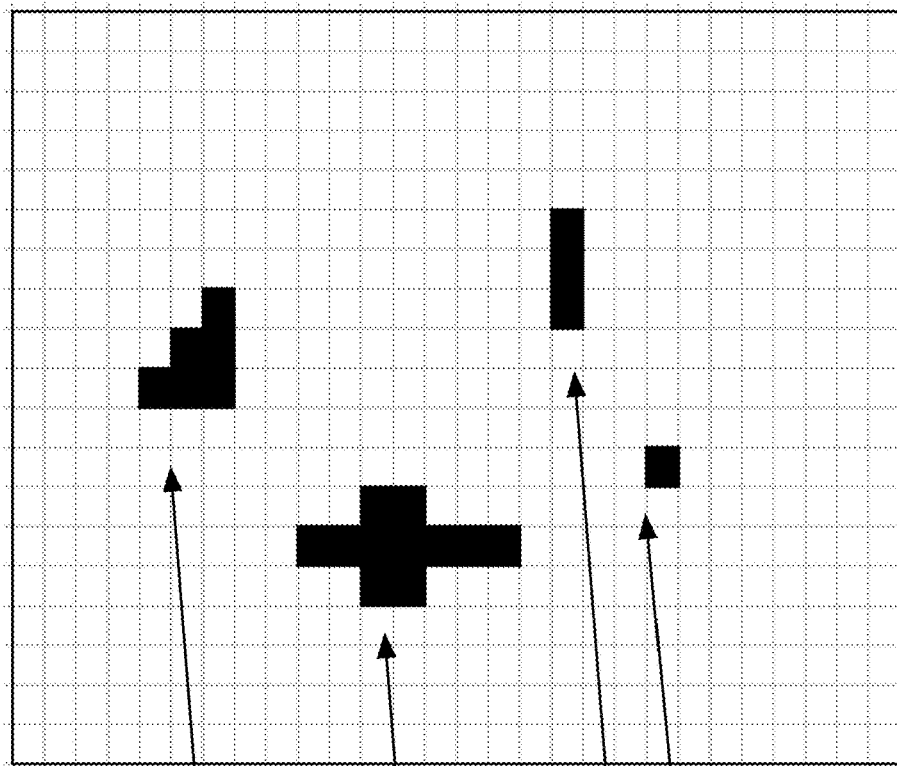
FIG. 9 illustrates one embodiment optical flow across a small sensor.
Figure 9:
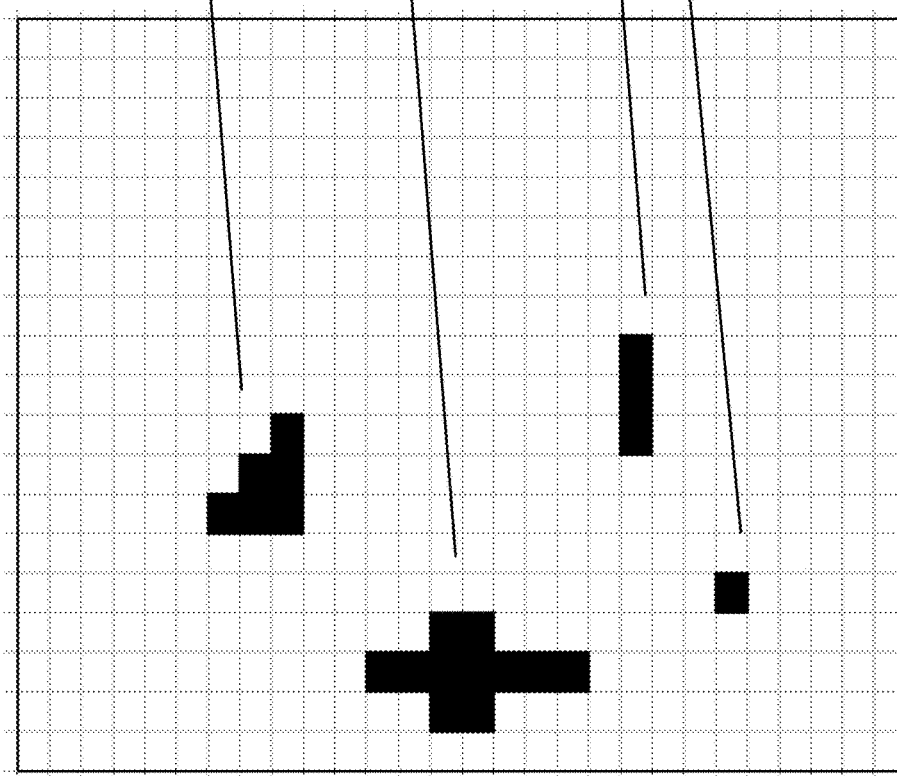

The processor 130 in one embodiment utilizes a sample comparator 135 to compare two samples of data. In one embodiment, the two samples of data are subsequent samples, in a sequence of captured samples. FIG. 9 illustrates one example two captured samples, and the result of the comparison via optical flow.

The relative position calculator 140 calculates a relative position of the eye using the data from sample comparator 135. The relative position calculator 140 determines a movement of the eye between the captured samples, e.g. the relative change in the position of the eye. In one embodiment, the relative position calculator 140 outputs data indicating movement from the prior position, e.g. movement size and direction.

In one embodiment, the absolute position calculator 145 uses the output of the relative position calculator 140 and a prior known absolute position and calculates the new absolute position or current gaze direction of the tracked eye. In one embodiment, the absolute position calculator 145 also utilizes other sensor inputs in this calculation. In another embodiment, the system may not include the absolute position calculator 145 and the relative position calculation is used.

In one embodiment, the relative eye tracker is used in a head mounted display (HDM). For such systems, based on the position calculation, alignment positioner 190 ensures that any images displayed to the user are positioned appropriately. This is useful in augmented reality as well as virtual reality type systems. In one embodiment, the display processor 180 positions the images shown on the display system 195 appropriately for the user.

In one embodiment, the system includes a global correction system 160 which provides an authoritative[1] absolute position, that may be used to adjust the calculated absolute position generated by absolute position calculator 145. This may be used to correct the absolute position determined by absolute position calculator 145. It may also be used to trigger a recalibration of the relative position calculator 140.

In one embodiment, global correction system 160 includes one or more of an eye map based corrector 162, gaze tracking based corrector 164, and camera based correction system 168. In one embodiment, the system includes one of these correction systems 160 or another system to generate the authoritative absolute location data.

The eye map based corrector 162, in one embodiment, assembles image data captured over time to create an eye map in memory 130. The eye map may be used to verify the eye position, when a captured sample is recognized to be a particular portion of the eye. In one embodiment, the eye map generated by eye map based corrector 162 may be used by a global correction system 160 to calculate the authoritative absolute position of the eye. This may be used to correct the data for the relative position calculations, as will be described below. In one embodiment, it may also be used to trigger calibration. In one embodiment, the eye tracking data, and mapping data, is stored in an encrypted form.

In one embodiment, global correction system 160 includes gaze tracking based correction 164. A gaze tracker utilizes a known stimulus in a known location to the user to correlate the eye position and movement with the position and/or movement of the known stimulus. The known stimulus may be a generated image, or an external image in a known position. This may be used to set an absolute position of the eye. In one embodiment, the gaze tracker 164 may utilize a moving known stimulus in a predetermined way, to calibrate the relative position calculator 140.

In one embodiment, global correction system 160 may include camera based correction system 168 which uses camera capture system 166A/166B. The camera capture system 166A/166B captures images of the eye to calculate the absolute position of the eye. In one embodiment, the camera based correction system 168 is triggered periodically. The various methods of triggering the camera based correction system 168 are described below.

In one embodiment, the system may periodically turn on one or more of the elements of the global correction system 160 to validate the accuracy of the relative position calculator 140. In one embodiment, the global correction system 160 may be used to correct the relative position calculator's data.

In one embodiment, the system includes a tracking quality system 170. Tracking quality system determines how accurately the system is tracking the user's eye movements. The tracking quality system 170 includes one or more of a slip calculator 172, a global correction system (GCS) based trigger 174, a head movement based tracker 176, and a signal integrity analyzer 178. In one embodiment, the tracking quality system determines whether the tracking quality is sufficient to generate useful tracking data, e.g. above a threshold. If tracking quality is below the threshold, the tracking quality system adjusts the system and/or uses user interface 128 to alert the user to correct the condition(s) causing the degradation in tracking quality.

In one embodiment, the tracking quality system 170 receives data from a second optical sensor and light source 122. This data is used by slip calculator 172. Slip calculator 172 determines whether the system is slipping relative to the user's head. In one embodiment, the system is embodied in a head mounted display (HMD), worn by a user. When the apparatus itself slips, the calculations for the eye position and the positioning of any image elements displayed become incorrect. In one embodiment, the slip calculator 172 uses a sample comparator, based on data from the user's cheek, nose, temple, or other body part captured by the second optical sensor and light 122 to determine whether the system is slipping.

In one embodiment, if the movement is relatively small, the system uses the data from the slip calculator to adjusts the relative position calculator/absolute position calculator to account for the change in the position of the system. By compensating for the slip, the system ensures that the calculated positions remain accurate despite the system's movement. In one embodiment, if the slip is beyond a level that the system can compensate for, a user interface element 128 is used to alert the user to adjust the head-mounted display.

The global correction system (GCS) based trigger 174 determines that the tracking quality is degraded based on repeated differences between the calculated absolute position and the authoritative absolute position. This may trigger a user alert and/or calibration.

The head movement based tracker 176 uses instances where the user's eye movement is due to the vestibulo-ocular reflex (VOR), the system that ensures that the eyes track a stationary object when the head is moving. This may be used to evaluate tracking quality. In one embodiment, the data may then be used to adjust the relative position calculator. It may also be used to trigger recalibration.

The signal integrity analyzer 178 evaluates the quality level of the data being received. This may be used to detect when the system is askew, the system is in a good position, and the systems are functioning. In one embodiment, then when the signal integrity analyzer determines that the signal quality is below a threshold, the user interface element 128 may be used to trigger the user to adjust the system. This may include repositioning the system, rebooting the system, or taking other actions to improve signal integrity.

In one embodiment, the user interface element 128 may also be used to alert the user if tracking is lost for another reason. In one embodiment, the user interface element 128 may be a visual display (e.g. indicating to the user to adjust the device, audio, visual cues, or other ways of communicating information.

In one embodiment, the system further includes one or more head movement sensors 126. These sensors 126 may be used in correction, and optionally to trigger calibration, as will be described below, as well as in positioning display elements in an AR environment.

In one embodiment, the system includes a position predictor 150. The position predictor 150 utilizes the relative position data and detects when a particular eye movement is started and predicts the eye movement. For example, for saccadic movement, the position predictor 150 detects the point of peak velocity and uses this estimate, along with the movement vector, to predict the end point of the saccadic eye movement. The end point defines the ending location and the ending time of the saccade.

In one embodiment, data from the position predictor 150 may be used by global correction system 160 to turn on the camera based correction system, as will be described below. In one embodiment, position prediction is used to ensure unreasonable data is not provided to the system. In one embodiment, the position predictor 150 may run continuously for validating data reasonability. In one embodiment, the position predictor 150 may be turned on periodically.

In one embodiment the system accounts for a user's blinking, so that it does not cause false indications of eye movement. Blink detection 155, in one embodiment, measure the data from a blinking action a user is prompted to perform. In one embodiment, the system can automatically calibrate for a user's blinking. The eyelid motion is a specific motion that occurs periodically, and the system can determine what measurements represent a user's blinking. This is used to ensure that blinking does not cause false measurements of eye motion.

Figure 2:
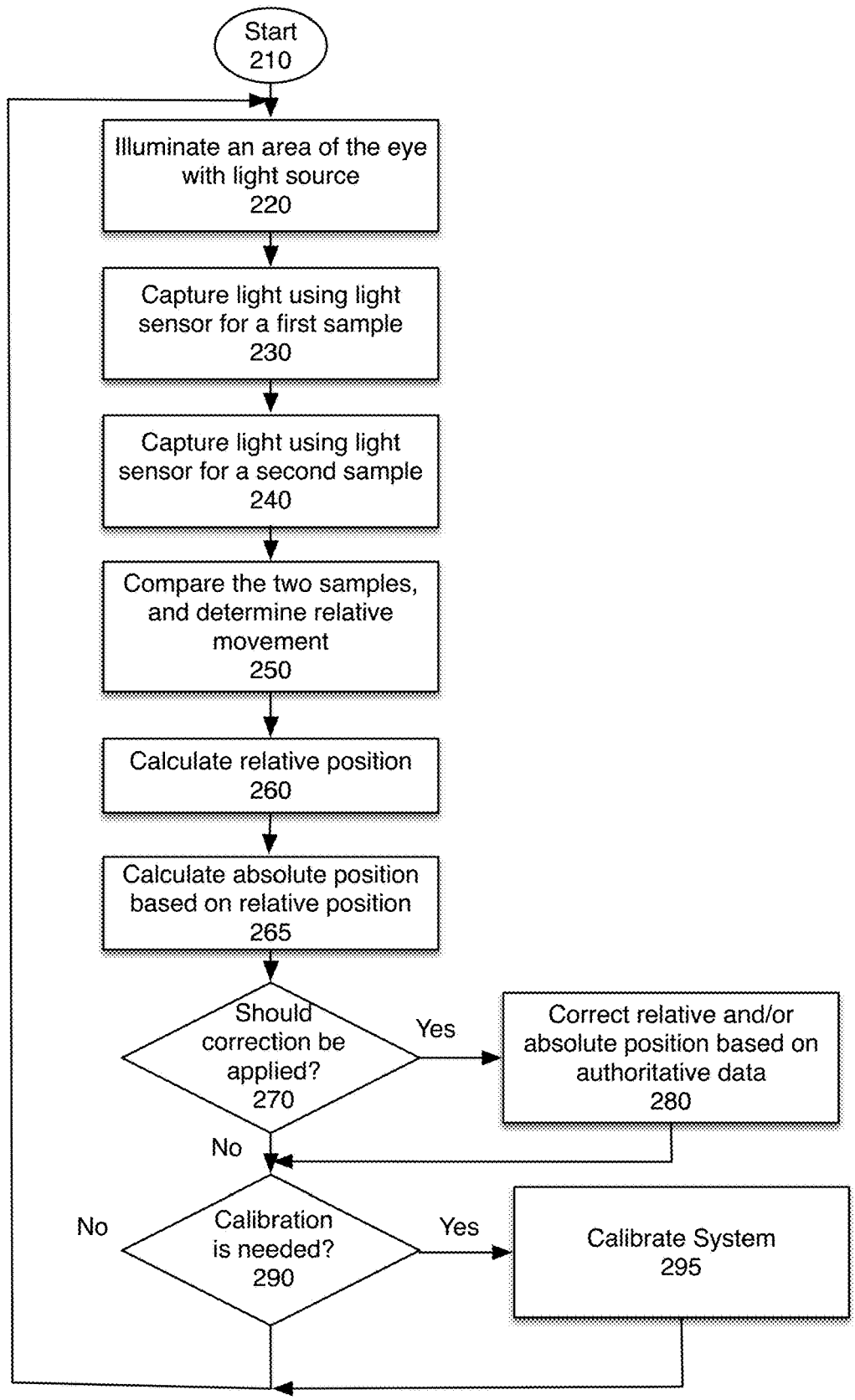
FIG. 2 is a flowchart of one embodiment of eye tracking.

FIG. 2 is an overview flowchart illustrating one embodiment of the relative location determination process. The process starts at block 210.

At block 220, the light source is used to illuminate an area of the eye. This may be done by LED, laser scatter, Doppler laser, darkfield, brightfield and/or other mechanism, as discussed above. In one embodiment, a single light source is used. In another embodiment, multiple light sources may be used. In one embodiment, a subset of a plurality of light sources may be used, selected based on the user's anthropomorphic configuration In one embodiment, a subset of a plurality of light sources may be used, selected based on lighting conditions.

At block 230, the system captures light using the light sensor. The light captured may be scatter, reflection, and/or interference pattern. In one embodiment, the sensor that captures the light captures only a small segment of the eye. In one embodiment, the system includes one light sensor. In other embodiments, multiple light sensors may be used and all or a subset may capture data.

At block 240, the system captures light for another sample. In one embodiment, the time between the captures is very short. In one embodiment, the frequency of capture is 1 KHz, that is 1000 samples are captured per second. In comparison, traditional eye tracking systems capture 60-80 images per second.

At block 250, the system compares the two samples, and determines a delta between samples to determine a relative movement of the eye. In one embodiment, the relative movement is expressed as a change in the X and Y coordinate systems. In one embodiment, the relative movement is expressed in arc minutes and direction. In another embodiment, an analog sum of pixels may be compared, rather than directly comparing image data.

At block 260, the relative position of the eye is calculated based on the sample delta, and the absolute position is calculated based on the relative position and prior absolute position calculations.

At block 265, the absolute position is calculated based on the relative position.

At block 270, the process determines whether it is time to apply a correction to the system. Correction is applied to the system when the system compares the calculated absolute position to the authoritative absolute position, and when needed corrects the settings of the relative position calculator and/or absolute position calculator. The correction may be triggered after a long blink, periodically, or when certain eye movement sequences occur, such as a saccade.

When it is triggered, at block 280, the authoritative position is obtained, and if necessary, correction is applied to the system. The correction may be an adjustment of one or more parameters used by the relative position calculator. The process then continues to block 290.

At block 290, the process determines whether calibration is needed. In one embodiment, when the system has slipped, or a VOR based evaluation shows a problem, or there is signal degradation, calibration is needed. Other signals that the system is not functioning as well as it should may trigger calibration. In one embodiment, calibration may be triggered periodically. If calibration is needed, at block 295, the system is recalibrated.

The process then returns to block 220 to continue sensing the relative position data.

In some embodiments, as will be described below the system may include one or more of:
  Calibration based on displaying a sequence of images
  Calibration based on an extrapolated model of motion
  Prediction of eye absolute position
  Saving the captured eye image data, to create a map of the eye
  Prediction of eye absolute position (gaze direction and gaze point) during a saccade.
  Slip detection, and adjustment of the display based on slip detection. This may be done with a relative location determination process as well.

There are many advantages of this relative location based approach. These advantages include: a small tracking area significantly smaller than the area of the exposed eye, which results in easier placement of the sensors and more robust sensing in a large range of anthropomorphic features across the population; less data bandwidth, processing, and analyzing which results in faster, lower latency results with less compute power; smaller sensors and fewer emitters require less power; simpler illumination results in easier integration, lower power and lower cost; and higher tracking resolution when compared to camera based eye-tracking systems.

These advantages are particularly helpful for augmented reality (AR), mixed reality, and virtual reality (VR) applications, such as head mounted displays, goggles, glasses, and the like.

In one embodiment, the relative location based system may include the global correction system to provide authoritative absolute position data. In this arrangement, in one embodiment, the relative eye tracking is used to get fast, low power eye position, and the global correction system is used periodically to correct the relative eye-tracking system, check for accuracy.

The camera-based system to acquire authoritative absolute position may be:
(1) sampled periodically,
(2) sampled after a saccade has completed,
(3) sampled after a saccade has completed and the velocity and position are stabilized,
(4) sampled after the relative eye position has changed by a certain amount,
(5) sampled after a correctable slip has been detected,
(6) sampled when certain content is shown on the display,
(7) sampled when VOR data shows inaccuracy,
(8) sampled after long blink and/or excessive blinking The frequency of triggering of the camera-based system is a tradeoff between tracker accuracy vs total power consumption. In one embodiment, the frequency may be adjusted based on the needed accuracy. For example, when detailed images are overlaid a real-world image in an AR system, the accuracy may be more important, and the camera-based system may be triggered more frequently.

In one embodiment, the processor can distinguish between blinking and eye motion, to ensure that blinking data is not used incorrectly to adjust the position of the display. The eye lid can be distinguished from the eye by the image of the surface, scattering of the light, or by the specific motion of the eyelids while blinking. In one embodiment, the image and motion profile of the eyelid may be captured during a calibration process.

Figure 3:
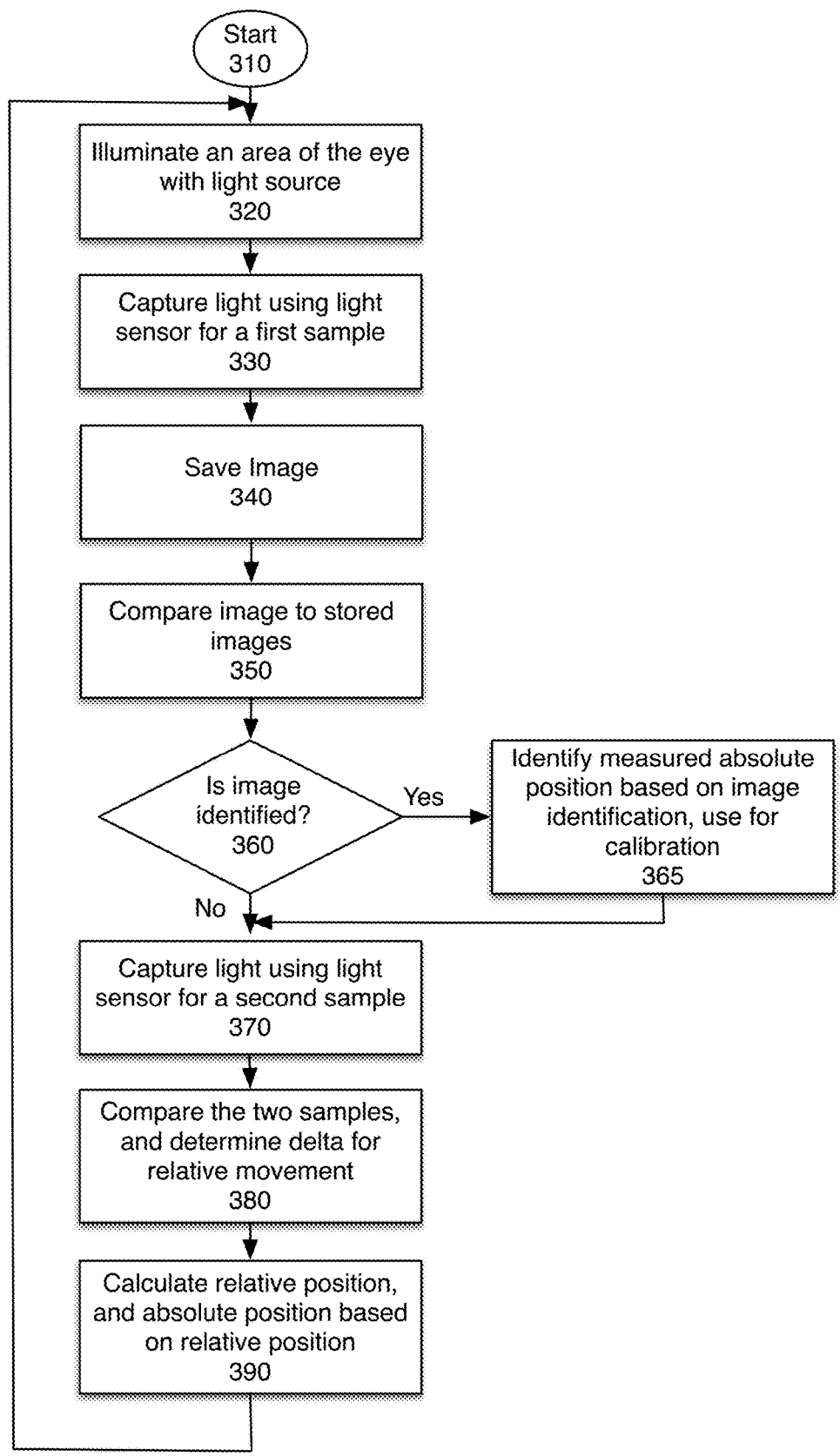
FIG. 3 is a flowchart of one embodiment of eye tracking including eye mapping.

FIG. 3 illustrates one embodiment of utilizing an authoritative absolute position to correct a relative eye tracker using an eye mapping system. The process starts at block 310. An area of the eye is illuminated, at block 320, and a first sample is captured at block 330. When the sample is captured, it is saved, at block 340. At block 350, the captured image is compared to stored images. The stored images are used to build a map of the user's eye. In one embodiment, the system saves the images defining the center position of the eye (e.g. the user looking straight ahead). When the eye returns to the center position, the system recognizes the position and corrects for any error.

In one embodiment, the system saves images of the eye from a calibration process. Periodically, the system checks a captured image against the saved images from the calibration process to verify the absolute position of the eye and correct any cumulative errors. In one embodiment, the system saves the images used for the relative location determination, for locations of the eye, over time creating a map of the eye. In one embodiment, all images captured may be saved. In another embodiment, only some images are saved. This map is then used as a reference for determining the authoritative absolute eye position.

At block 360, the process determines whether the image is identified, that is whether it is matched to an identified stored image. If so, at block 365, the authoritative absolute position is obtained, based on the image identification. This data may be used to correct the relative motion sensor. It may in one embodiment be used to continue refining the eye map.

At block 370, a second sample is captured. The two samples are compared, at block 380, and the relative position is calculated based on the sample comparison, at block 390. The relative position data is used to calculate an absolute position. The process then returns to block 320 to continue processing images.

Figure 4:
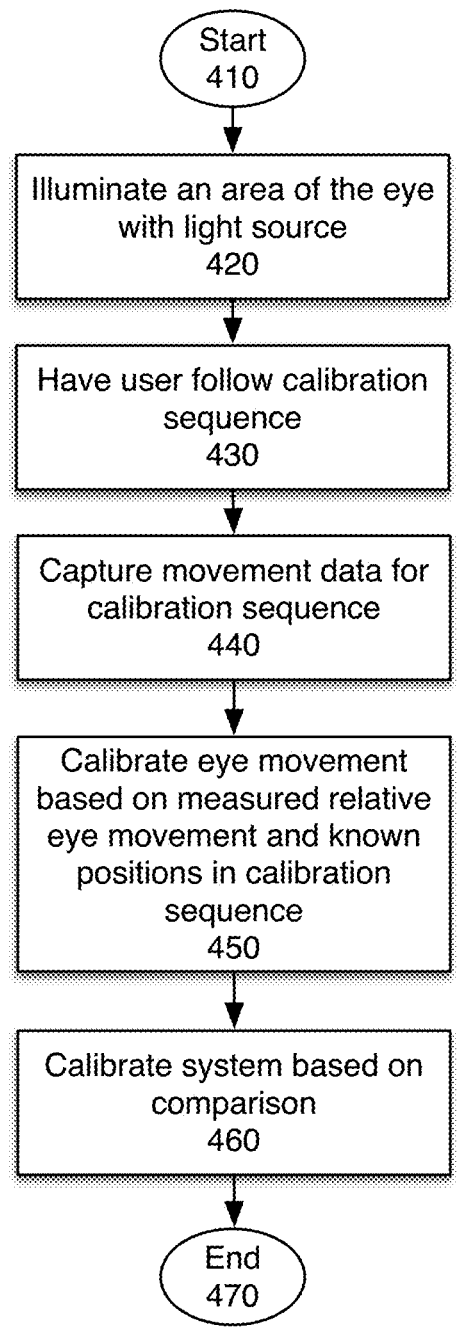
FIG. 4 is a flowchart of one embodiment of calibrating the system.

FIG. 4 illustrates one embodiment of calibrating the system using known calibration images. There are several methods of calibrating the system, this uses a known image. Other methods of calibration may be used.

At block 420, a portion of the eye is illuminated. At block 430, the user is prompted to follow the calibration sequence. In one embodiment, a predetermined sequence of one or more calibration images are shown. In one embodiment, a smoothly moving image is shown, to trigger a particular eye movement pattern of smooth pursuit. The calibration images may be a sequence of points at known locations. The calibration image may be a set known stimulus at a fixed location. The calibration image may be an external fixed object, which is visually perceivable, in an AR system. When the system knows a motion path for a particular image being shown, it can correlate the eye tracking data to the expected eye motions.

At block 440, movement data is captured for the calibration images. At block 450, the system is calibrated by correlating the relative distance the eye has traveled and the known positions of the calibration images. In one embodiment, at block 460, the relative motion system is recalibrated based on the comparison. In one embodiment, the relative position algorithm parameters are updated. The process then ends at block 470.

In one embodiment, the calibration of the system is continually refined, and calibration parameters are adjusted based on a determined discrepancy between the calculated absolute position and the authoritative absolute position. By continuously adjusting the calibration parameters, the system can maintain accuracy even as the system shifts, or changes over time.

Figure 5:
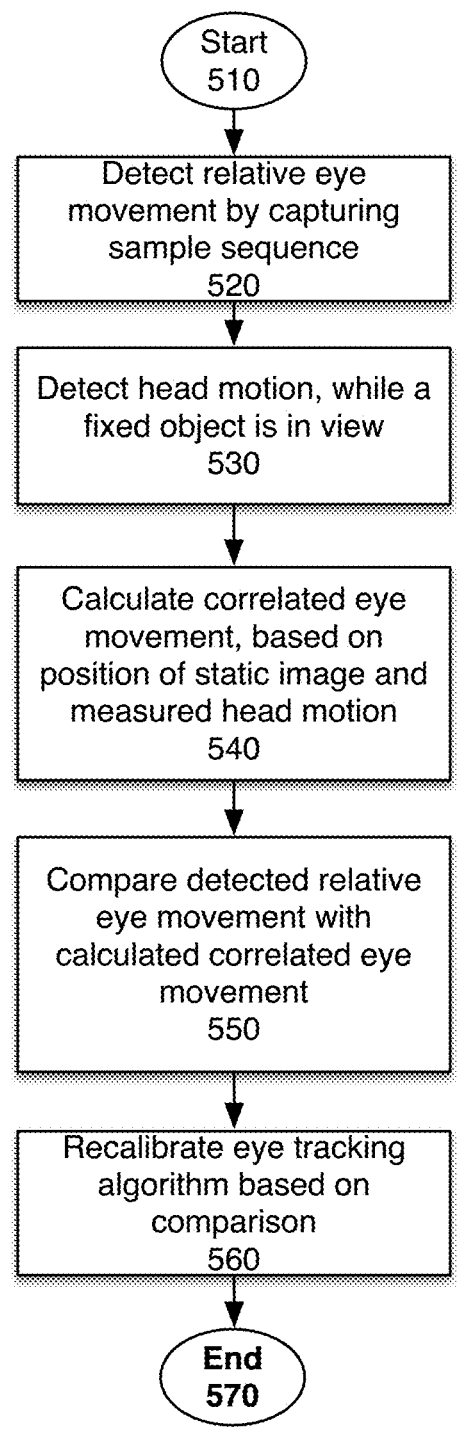
FIG. 5 is a flowchart of one embodiment of head motion based calibration.

FIG. 5 illustrates one embodiment of utilizing head motion data for calibration. Due to the vestibulo-ocular reflex, used to stabilize images during head movement, an automatic eye movement opposite to the head movement is produced by reflex when the user is viewing a stimulus at a fixed location. This reflex may be used for correction and calibration. In one embodiment, the system can automatically determine when to enter a calibration mode based on visual and head motion data. This may be determined based on contextual awareness of the content presented to a user. The content may be a fixed real-world element.

The process starts at block 510. At block 520, relative eye movement is detected, by capturing a sequence of samples, and doing a comparison, as discussed above.

At block 530, head motion is detected while the fixed object is in view. This may be automatically triggered, when the system knows a particular object is static and the user's head is in motion. The VOR can be used to correlate the eye tracking data to the expected eye motions. For example, if there is only one static object, the system knows that the user is looking at that object.

At block 540, the eye movement correlated to the measured head motion is calculated. At block 550, the detected relative eye movement is compared with the calculated correlated eye movement.

This data can be used to correct the tracking algorithm, in one embodiment. If the comparison shows that the data does not match, it can also trigger a global recalibration of the tracking algorithm based on the comparison, at block 560. The process then ends.

In one embodiment of calibration, a head-mounted display system with eye-tracking and slip detection can reset its nominal eye-tracking and slip detection positions by ensuring the user is in the eye-box with static centered image presented to the user in the display.

Figure 6:
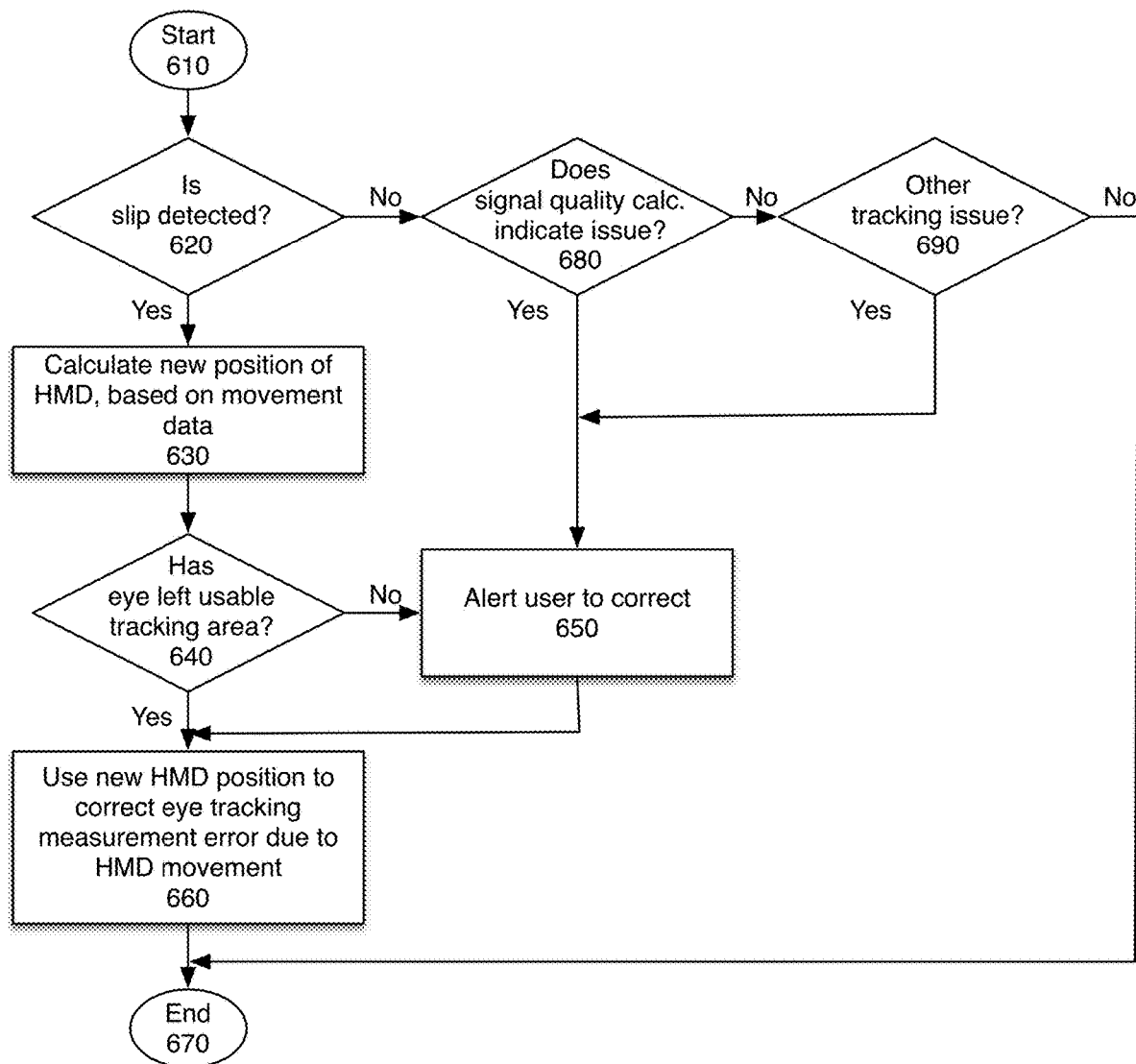
FIG. 6 is a flowchart of one embodiment of slip compensation, which may be used with the relative position based eye tracking system.

FIG. 6 illustrates one embodiment of addressing the positioning of a head mounted display (HMD). The process starts at block 610.

At block 620, the system determines whether there was movement between the HMD and the user's head. A slip detection sensor measures the distance and direction of movement of the HMD with respect to the nominal position on a user's head. This is useful because relative position tracking tracks only the relative change between the object (the eye) and the detector (which may be integrated into the head mounted display). Thus, by using the slip detection sensor the system can account for any changes in the position of the tracker.

The position of a head mounted display relative to the head is important for several factors. Some eye tracking methodologies are sensitive to slip of the head mounted display relative to the head. Some head mounted displays (HMDs) have designs with small exit-pupils that need to be aligned to the pupil of the eye. Tracking the position of the HMD relative to the head can ensure that such HMDs function well.

In one embodiment, slip detection may use motion sensors placed at one or more locations on the HMD to track the relative motion between the HMD and the user's head. In another embodiment, slip detection may use relative location tracking, against a user's cheek or other body part. They can track relative movement via optical flow, brightfield, darkfield, or speckle pattern or other methods. As noted above, these sensors provide high accuracy (over 5,000 counts per inch and rising), low latency (sample rates over 1 kHz) with low power consumption (<10 mW) in a small package size (less than 5 mm×5 mm×2 mm), making them attractive choices for this application.

The sensors could be located in one or more locations in the HMD. For instance, the sensors could be in both temples looking at the skin over the temples of the head. This could be used to correct the slip error of the eye tracking by measuring the relative movement of the HMD and using this data to correct the error. The sensors could also be in the nosepieces or any other location on the HMD that is within a few centimeters of the head.

If slippage was detected, at block 630, the system calculates a new position of the HMD based on the movement data.

At block 640, the process determines whether the eyes have usable tracking area, that is whether the system can continue to function after the slip. In one embodiment, one reason that the system may not be able to function is that user's eye has left the eye box. If the exit pupil of an HMD is small, it's difficult to get it aligned to the user's eye. Once it is aligned, the relative motion sensors can monitor how much the HMD has moved to see if it has moved far enough to cause the user to move outside the eye box. Another reason may be that a skew has shifted the light source and/or sensor into a position that makes tracking problematic.

If the movement is sufficient to leave no usable tracking, at block 650, the system can alert the user which way to move the HMD to adjust it to the proper position again.

If there is usable tracking area, at block 660, the new HMD position is used to correct eye tracking measurement error due to the movement. Some HMDs could have a steerable eye box. The movement of the HMD can be used to steer the eye box so that the user does not lose the image. If the system has a steerable eye box, the user is only alerted to adjust if the movement places the user's eye outside the steerable range, in one embodiment. Otherwise, the system automatically adjusts the eye box and the relative eye tracking, at block 660. The process ends at block 670.

If no slippage was detected at block 620, the process at block 680 determines whether the signal quality evaluation indicates that there is an issue. The signal quality evaluation determines whether signal quality is sufficient to use the tracking system. If the signal quality is below the threshold, the process continues to block 650 to alert the user to correct the cause. In one embodiment, the user may be prompted to initiate a calibration, adjust position, or otherwise correct the issue.

At block 690, the process determines whether there is another tracking issue. As noted above, other tracking issues include consistent discrepancies between the absolute eye position calculated based on relative position, and the authoritative absolute eye position, differences between expected eye movements in a VOR evaluation and measured eye movements. Other tracking issues may include ambient light levels that wash out the signal, misalignment, or any other condition which may impact the tracking quality of the relative eye tracker. If there is another tracking issue, the user is alerted to address it at block 650. Otherwise, the process ends at block 670.

Figure 7:
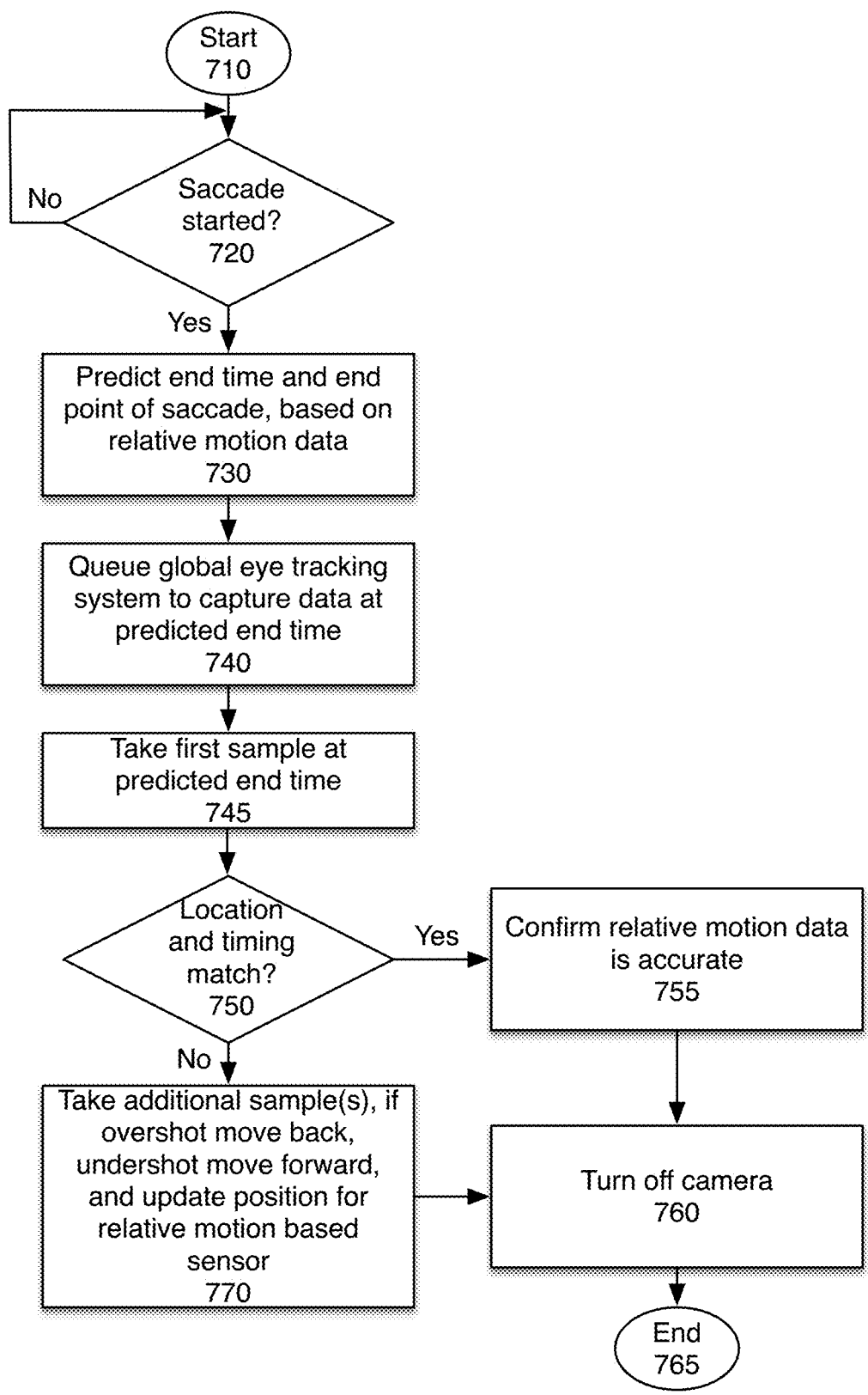
FIG. 7 is a flowchart of one embodiment of calibration timing.

FIG. 7 is a flowchart of one embodiment of correction and/or calibration based on camera data for a saccade. In one embodiment, while utilizing the camera for detecting absolute position is expensive and slow, utilizing the camera to correct the relative position based system is efficient and can be down with lower power and processing requirements. Because the camera and its associated light sources are only ON sometimes, the power consumption and processing overhead is significantly reduced. The process starts at block 710. While this process is described for triggering based on saccade, one of skill in the art would understand that a similar process may be used for other types of eye movements. At block 720, the process determines whether a saccade has started. If not, it waits until a saccade starts.

When a saccade starts, at block 730, the end time and end position of the saccade is calculated. This type of motion prediction is enabled by the high frequency of the image acquisition in the relative eye tracking system, as described above. A saccade's movement is predictable, and its ending location and time can be calculated from the inflection point. Therefore, if motion data is obtained at a high enough frequency, by identifying the half-way point of the saccade the location and timing of the end point can be predicted with high accuracy.

At block 740, the camera, used to capture the authoritative absolute position data, is directed to acquire an image at the predicted end time, at block 745. If the prediction was accurate, the camera should be activated when the eye comes to rest after the saccade.

At block 750, the process determines whether the position and timing match. If so, the relative motion data is accurate, and is confirmed, at block 755. The camera is then turned off, at block 760, and the process ends at block 765.

If the location and or/time did not match, at block 770, additional samples are taken. If the time estimation was incorrect, the camera is kept on, until the correct image is captured. In one embodiment, multiple additional images are obtained with the camera to ensure a match. The relative motion based sensor is then updated based on the information from the camera. The process then continues to block 760.

In this way, the system can use the saccade prediction to obtain the camera images of a still eye, providing improved accuracy while maintaining the efficiency and low overhead of the relative position sensor.

Figure 8:
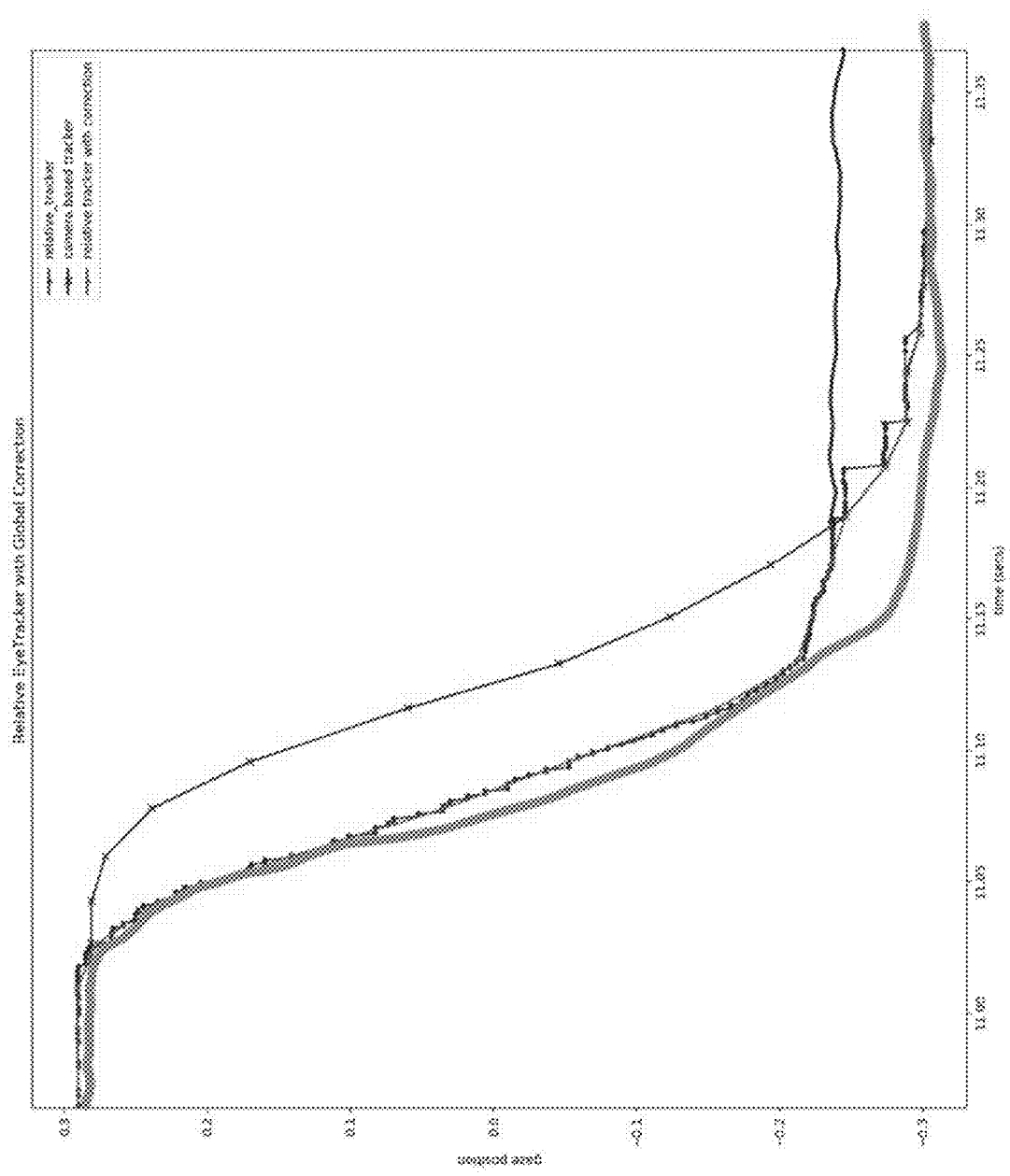
FIG. 8 illustrates one embodiment of comparative data from the relative position based eye sensor and a camera based sensor.

FIG. 8 illustrates one example of real data taken from a relative eye tracking system, with global correction over 0.35 seconds. The purple line indicates the relative eye tracking based gaze position. As can be seen, a lot of data is collected. The blue line illustrates the camera based tracker, which obtains data much less frequently. The green line illustrates the real eye position data.

At the start of a saccade, at time 11.05, the two systems are in alignment. During the saccade, the relative tracker tracks much more closely, because of the frequency of its testing. The relative tracker is very accurate at detecting the start of the eye movement, but without correction would have ended the move at around −0.23 instead of −0.3.

The camera based tracker has a higher latency and thus is delayed from the real data during the saccade. However, when the saccade ends, the camera based tracker is more accurate.

Therefore, at time 11.20, at the end of the saccade the camera-based correction is applied. By timing the correction appropriately, the system has the best quality data, and also saves power. At the flat parts of the graph at the beginning and end with minimal eye movement, correction is unnecessary and would consume additional power. During the saccade, while the relative tracker is moving, global correction is actually not beneficial because it would negate the lower latency benefit of the relative tracker and make tracking worse.

In this example, to illustrate the effect of the higher latency, the camera based tracker is shown as obtaining data during the saccade, as well as before and after at a steady rate. However, the camera based tracker may be turned off when global correction is not being applied.

Of course, though some of the above figures are shown as flowcharts, in one embodiment elements may be rearranged unless they are dependent on each other. Systems may be implemented as an interrupt-driven systems, such that there is no waiting until something occurs. Additionally, the ordering of independent elements within flowcharts is arbitrary.

Figure 10:
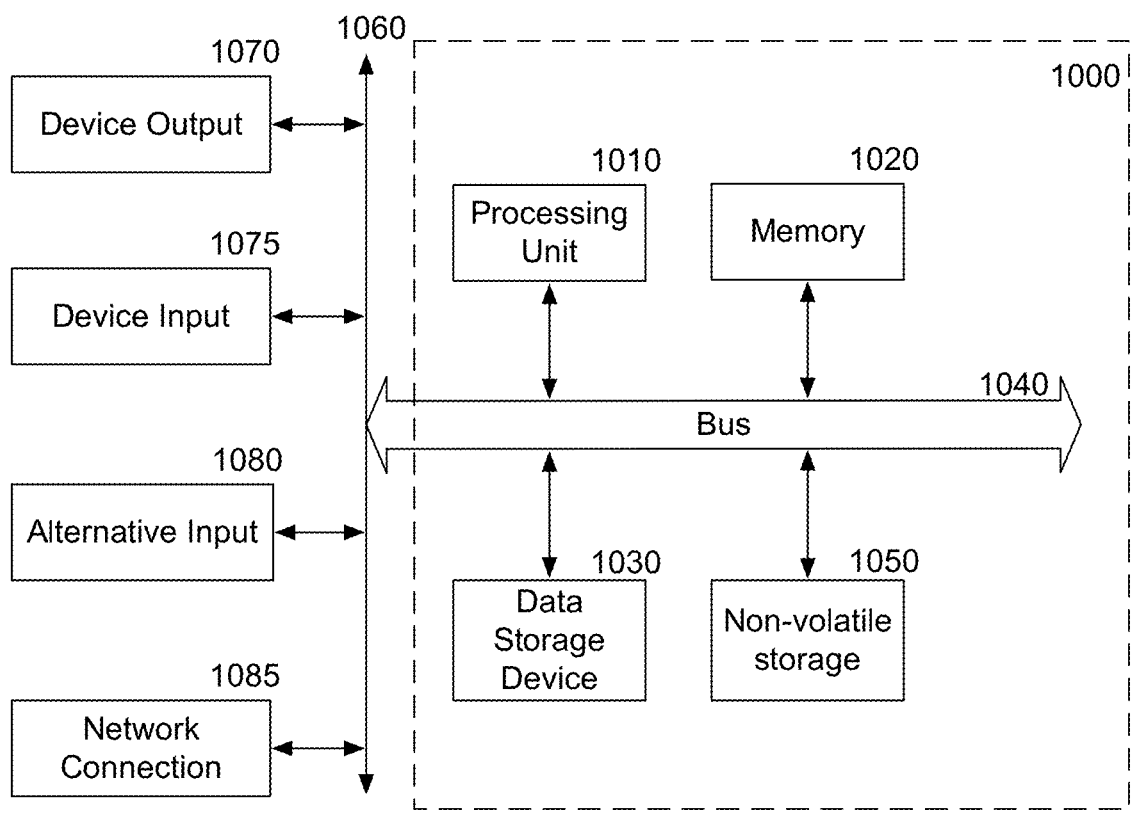
FIG. 10 is a block diagram of one embodiment of a computer system that may be used with the present application.

FIG. 10 is a block diagram of one embodiment of a computer system that may be used with the present invention. It will be apparent to those of ordinary skill in the art, however that other alternative systems of various system architectures may also be used.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment, the system also includes a data storage device 1030 such as a magnetic disk or optical disk and its corresponding disk drive, or Flash memory or other storage which is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.)

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is cursor control device 1080, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1040, the processor 1010, and memory 1050 and/or 1020.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A relative position based eye tracking system comprising:
    a light source to illuminate a portion of an eye;
    an optical sensor to capture a sequence of samples of a portion of the eye;
    one or more processors configured to implement a sample comparator to compare two samples;
    the one or more processors configured to implement relative position calculator to calculate a change in a position of the eye based on data from the sample comparator; and
    the one or more processors configured to implement a global correction system triggered based on a non-time based trigger, the global correction system to correct the relative position calculator, wherein the non-time based trigger for the global correction system is an accumulated error.

2. The system of claim 1, further comprising:
    the one or more processors configured to implement the global correction system to periodically determine an authoritative absolute position of the eye based on external data and use the authoritative absolute position to correct the relative position calculator.

3. The system of claim 1, further comprising:
    the one or more processors configured to implement a position predictor to predict a final position of the eye after an eye movement, the final position of the eye used by the global correction system to determine accuracy of the relative position calculator.

4. The system of claim 1, wherein the global correction system is initiated based on detection of a saccade.

5. The system of claim 1, wherein the global correction system comprises one of:
    an eye map based correction to compare a sample from the optical sensor to the map of the eye to determine an authoritative absolute position; or
    the one or more processors configured to implement a gaze tracking correction to display a known stimulus in a known location to a user and capture the eye position to obtain the authoritative absolute position.

6. The system of claim 1, further comprising:
    a second optical sensor directed to a user's face;
    the second optical sensor to capture a sequence of samples; and
    the one or more processors configured to implement a slip detection system to determine whether a wearable apparatus incorporating the relative position based eye tracking system is slipping based on the sequence of samples.

7. The system of claim 1, further comprising:
    the one or more processors configured to implement a slip detector system to detect whether a wearable apparatus incorporating the relative position based eye tracking system is integrated is slipping; and
    wherein the non-time based trigger for the global correction system is a determination by the slip detector system that the wearable apparatus is slipping.

8. The system of claim 1, wherein the non-time based trigger for the global correction system is identifying blinking by a user.

9. The system of claim 1, wherein the non-time based trigger for the global correction system is a trigger number of sample points by the optical sensor that indicate movement.

10. The system of claim 1, further comprising:
    a head movement sensor to sense movement of a user's head; and
    wherein the non-time based trigger for the global correction system is an indication from the head movement sensor.

11. The system of claim 10, wherein the non-time based trigger for the global correction system is the one or more processors identifying vestibulo-ocular reflex (VOR) eye movement based on data from the head movement sensor and an eye movement sensor.

12. The system of claim 11, wherein data from the VOR eye movement may be used as part of the global correction system.

13. The system of claim 1, wherein the non-time based trigger for the global correction system is user input.

14. A system to enable relative position based eye tracking, the system comprising:
a memory;
a processor in communication with the memory, the processor to:
compare samples of images captured of a portion of an eye;
calculate a change in a position of the eye based on the comparison;
utilize the change in the position of the eye to calculate an actual position of the eye; and
utilize a non-time based trigger to trigger a global correction system to correct the actual position of the eye, wherein the non-time based trigger for the global correction system is an accumulated error.

15. The system of claim 14, wherein the global correction system is initiated based on detection of a saccade.

16. The system of claim 14, wherein the non-time based trigger for the global correction system is an indication that the system is slipping.

17. A method of eye tracking in a wearable system comprising:
illuminating a portion of an eye;
capturing a sequence of samples of a portion of the eye;
comparing two samples;
calculating a change in a position of the eye based on the comparing, the change comprising a relative position of the eye;
determining a position of the eye from the relative position; and
triggering, using a non-time based trigger, a global correction system to correct the position of the eye from the relative position, wherein the non-time based trigger for the global correction system is an accumulated error.

18. The method of claim 17, wherein the non-time based trigger is based on a number of samples indicating movement.

19. The method of claim 17, further comprising:
predicting a final position of the eye after an eye movement, the final position of the eye used by the global correction system to determine an accuracy of the relative position calculator.

20. The method of claim 17, further comprising:
displaying a known stimulus in a known location to a user and capture the eye position to obtain an authoritative absolute position for use by the global correction system to correct the position of the eye from the relative position.

* * * * *